July 7, 1931.  C. G. NATHE, JR  1,813,310
TIRE CHANGER JAW HOLDING MEANS
Filed Sept. 21, 1927
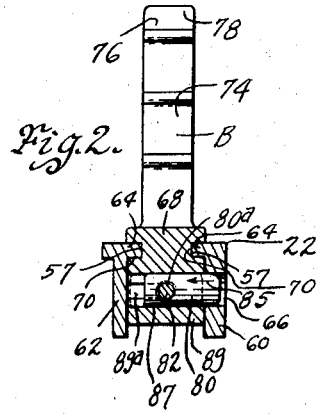
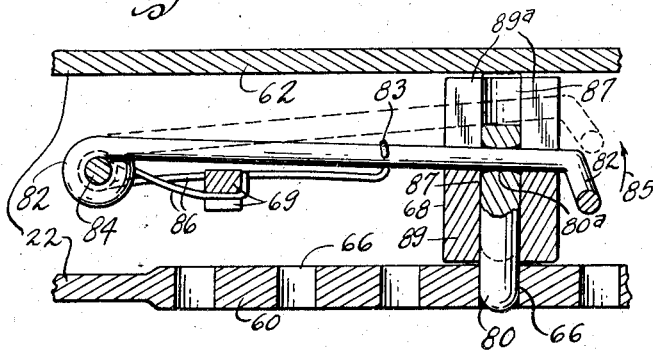
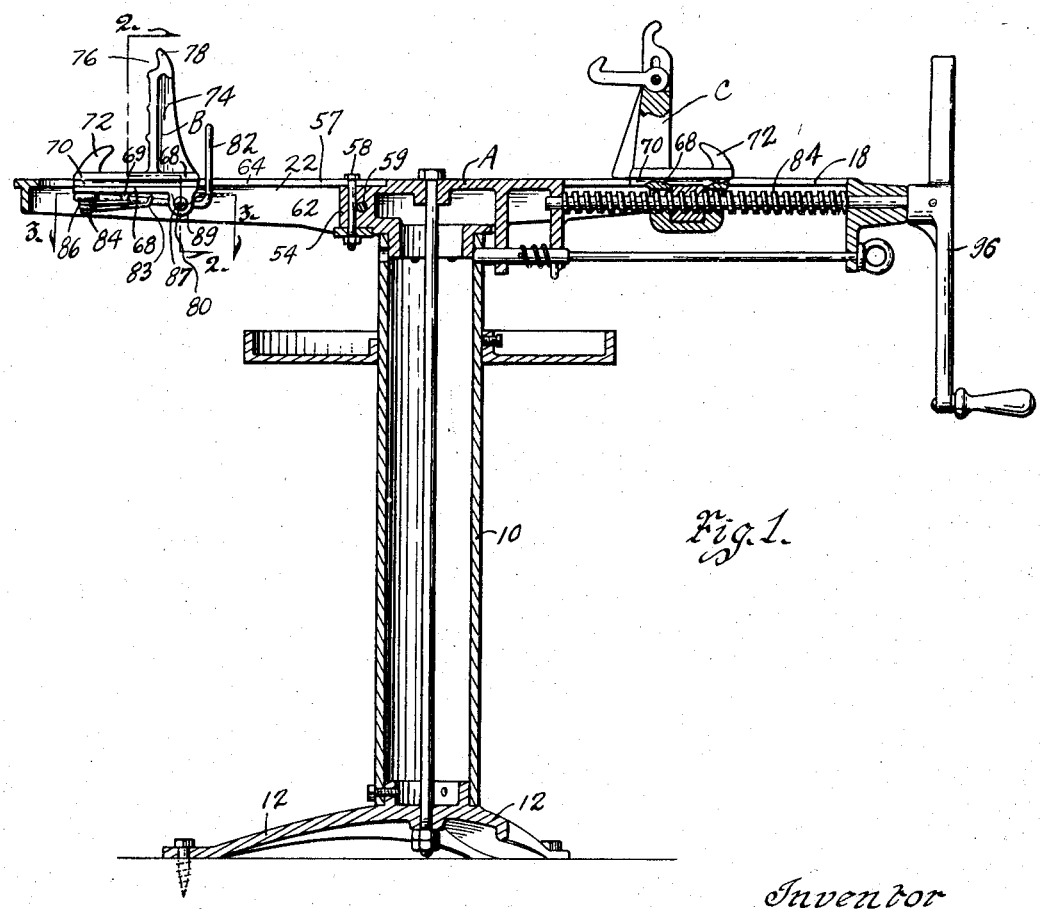

Patented July 7, 1931

1,813,310

UNITED STATES PATENT OFFICE

CHARLES G. NATHE, JR., OF MINNEAPOLIS, MINNESOTA, ASSIGNOR TO MARQUETTE MANUFACTURING COMPANY, OF ST. PAUL, MINNESOTA

TIRE CHANGER JAW HOLDING MEANS

Application filed September 21, 1927. Serial No. 220,904.

The object of my invention is to provide means for holding the adjustable jaw of a tire changer in adjusted position, such means being of simple, durable and comparatively inexpensive construction.

With this and other objects in view my invention consists in the construction, arrangement and combination of the various parts of my device, whereby the objects contemplated are attained, as hereinafter more fully set forth, pointed out in my claims, and illustrated in the accompanying drawings, in which:—

Figure 1 is a central vertical sectional view of a conventional form of tire changer showing my invention applied thereto.

Figure 2 is a vertical detail sectional view taken on the line 2—2 of Figure 1, showing the holding pin for retaining the rim engaging device or adjustable jaw in a predetermined position upon its arm; and Figure 3 is a horizontal detail sectional view of the same taken on the line 33 of Figure 1.

I have shown my invention applied to a conventional form of tire changer embodying a hollow standard 10 mounted upon a foot piece 12 and having radial arms 18 and 22, to one of which my invention is applied. A tire changer of this general character is usually provided with a single arm 18 and a pair of arms 22.

A jaw fitting C is slidably mounted on the arm 18 and is usually screw-threadedly actuated, such as by a screw-threaded shaft 84 and a crank 96.

The arms 22 are mounted upon stubs 54 formed upon a head fitting A by means of bolts 58 and 59 and it is on these arms that I mount my invention.

Each arm 22 is preferably a casting formed with a pair of side walls 60 and 62 which have inturned flanges 64 along their upper edges. The flanges 64 form guides upon which rim engaging and holding devices B may be slid and guided.

The wall 60 of each arm is formed with a plurality of horizontally spaced openings 66. The rim engaging and holding device B includes a head element 68 having a pair of channel grooves 70 therein for receiving the guide flanges 64 as clearly illustrated in Figure 2 of the drawings.

A jaw 72 is formed upon one end of the body 68. A vertically projecting rim engaging bar or surface 74 is formed upon the other end of the body 68. The bar 74 which engages a tire rim is formed with a notch 76 near its upper end which in turn forms a hook 78. Each entire rim engaging and holding device B is slidably mounted upon its arm.

The device B may be locked in various positions upon the arm by use of any one of the openings 66. A locking plug 80 is slidably carried in an opening 87 formed in a boss 89 of the body element 68 and is controlled by a rod 82. The rod 82 projects through slots 89a of the boss 89 and through an opening 80a of the locking plug 80 and is connected to a stud 84. A coil spring 86 extends around the stud 84 and is fixedly engaged at one end with a lug 69 which is fixed to the body element 68 and has its other end anchored around the control rod 82 as at 83.

The control rod 82 when moved from one position to another of its positions, as shown by dotted lines and arrows 85 in Figures 2 and 3, will cause the locking plug 80 to be entirely freed from any one of the openings 66. Normally the spring 86 will tend to force the locking plug 80 into one of the openings 66.

The control end of the control rod 82 is conveniently located adjacent the rim engaging and holding device and is mounted thereon so that by shifting the position of the control rod 82 an operator is able to free the plug 80 from any particular opening and thus allow the entire device B to be slid longitudinally upon its arm.

Although the control of the device B or means whereby it is locked relative to the arm upon which it is carried, is susceptible of a variety of embodiments, it is unnecessary to here describe and illustrate more than one form in order to give a full understanding of the invention both from its structural and functional standpoints. The form I have illustrated and here describe, is a preferred and desirable embodiment although other forms may be equally as well used.

The arms 22 each have a rim engaging and holding device B mounted thereon which is capable of longitudinal movement upon the arms. Each device B may be locked independently of the other so that one may be positioned farther from the center of the machine than the other. The jaw C has parts 68, 70 and 72 similar to the jaw B.

The devices B after they are once set for a practical job, are fixed. The jaw C however is manipulated by the crank 96 for engaging a tire rim in conjunction with the jaws B so that the rim can be expanded or contracted as desired, such engagement occuring with the outer faces of the jaws or the hooks 72 respectively.

I have here given a full explanation of the operation of my means for holding the adjustable jaw of a tire changer in adjusted position that a clear understanding may be had of my invention both in regard to its structural and functional details.

Some changes may be made in the construction and arrangement of the parts of my device without departing from the real spirit and purpose of my invention, and it is my intention to cover by my claims, any modified forms of structure or use of mechanical equivalents, which may be reasonably included within their scope.

I claim as my invention:

1. In a tire changer, an upright standard, an arm projecting therefrom, a tire engaging device slidable on said arm and means to lock the device at different positions on said arm, said means comprising a slidable pin selectively engageable with a row of spaced openings in said arm, an opening in said pin, a rod having one end pivoted to said device and its other end projecting loosely through said opening and spring means to constrain said pin toward engagement with said openings in said arm.

2. In a tire changer, an upright standard, an arm projecting therefrom, an upstanding tire engaging device adjustable on said arm and means to lock the device at different positions on said arm, said means comprising a slidable pin selectively engageable with a row of spaced openings on said arm, an opening in said pin, a rod having one end pivoted to said device and its other end projecting loosely through said opening and then extending upwardly to a position adjacent said upstanding tire engaging device and spring means to constrain said pin toward engagement with said openings in said arms.

Des Moines, Iowa, September 7, 1927.

CHARLES G. NATHE, Jr.